Patented Dec. 24, 1946

2,412,966

UNITED STATES PATENT OFFICE 2,412,966

CHEMICAL COMPOUNDS

Walter G. Christiansen, Glen Ridge, and Sidney E. Harris, Nutley, N. J., assignors to E. R. Squibb & Sons, New York, N. Y., a corporation of New York No Drawing. Original application September 9, 1937, Serial No. 163,034. Divided and this application June 28, 1944, Serial No. 542,619

5 Claims. (Cl. 260—473)

1

This application is a division of our application Serial No. 163,034, filed September 9, 1937.

This invention relates to, and has for its object the provision of, certain amino-alcohol esters of oxy-benzoic acids, and acid-addition salts thereof.

These esters have the general formula

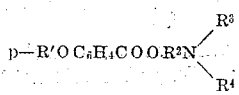

where R' is an alkyl residue with 3 to 4 carbon atoms, R² is an alkylene residue, and R³ and R⁴ are two alkyl residues.

The compounds of this invention are valuable therapeutic agents, being particularly effective for inducing local anesthesia.

In the practice of this invention, an aracyl halide of the general formula

is reacted with an alcohol of the formula

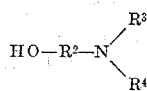

to produce the desired ester, R', R², R³ and R⁴ having the above-noted signification.

The amino-esters of this invention are generally recovered in the form of their addition-salts with hydrochloric acid. However, other acids forming addition salts with amines may be used in place of hydrochloric; such acids are boric, nitric, lactic, tartaric, citric, phosphoric, sulfuric, picric and picrolonic. The addition-salts may be converted into the free bases in the usual manner.

The following examples are illustrative of the invention:

EXAMPLE 1

β-Diethylamino-ethyl ester of p-n-butoxy-benzoic acid

A solution of 10.5 g. of p-n-butoxy-benzoyl chloride in 25 cc. of dry benzene is refluxed for two hours with a solution comprising 6.14 g. of β-diethylamino-ethanol in 10 cc. of dry benzene; the solution is allowed to cool and the hydrochloride of the desired ester separates as a heavy crystalline deposit; after filtering and washing the precipitate with benzene and dry ether a compound having a melting point of 146° C. (corrected) is obtained.

EXAMPLE 2

β-Dimethylamino-ethyl ester of p-n-butoxy-benzoic acid 4.5 g. of β-dimethylamino-ethanol dissolved in 10 cc. of dry benzene is treated with a solution comprising 10.5 g. of p-n-butoxy-benzoyl chloride in 20 cc. of dry benzene; filtering off the precipitate and washing it with benzene and petroleum ether yields the hydrochloride of the desired ester, having a melting point of 132–133° C.

EXAMPLE 3

Gamma-diethylamino-(β-hydroxy)-propyl ester of p-n-butoxy-benzoic acid

A solution of 5 g. of 1-diethylamino-2,3-propanediol, 6.2 g. of p-n-butoxy-benzoyl chloride and 10 g. of potassium carbonate, in 50 cc. of benzene, is refluxed for 90 minutes. On cooling overnight, the precipitate formed is filtered off and alcoholic hydrochloric acid is added to the filtrate, the resultant solution being evaporated to dryness. Recrystallizing the residue from alcohol and dry ether yields the desired product, which is a mixture of two isomers, and has no sharp melting point (79–96° C.).

EXAMPLE 4

α,α-di-(N-dimethylaminomethyl)-n-propyl ester of p-n-butoxy-benzoic acid 1.5 g. of 1,3-di-dimethylamino-2-ethyl-propanol-2 and 1.6 g. of p-n-butoxy-benzoic acid are each dissolved in 5 cc. of chloroform, and the mixture of the solutions is heated on a steam bath for 5 minutes. Adding dry ether, filtering the precipitate formed, washing and drying the filter cake, yields the hydrochloride of the desired product having a melting point of 111° C.

EXAMPLE 5

β-Diethylamino-ethyl ester of p-n-propoxy-benzoic acid

After mixing and refluxing solutions comprising 9.5 g. of p-n-propoxy-benzoyl chloride and 11.2 g. of diethyl-amino-ethanol, each dissolved in 25 cc. of benzene, for 30 minutes, the reaction mixture is cooled, and 100 cc. of dilute sodium hydroxide solution is added; then after vigorously shaking the mixture, the benzene layer, containing the desired ester, separates and is decanted off. Then washing the benzene solution with water, distilling off the benzene, and vacuum-distilling the residue, yields the desired ester, having a boiling point of 160–165° C./4 mm.

The hydrochloride is obtained (by dissolving this product in alcoholic hydrochloric acid and precipitating with ether) in the form of a white crystalline solid, melting at 135–137° C.

EXAMPLE 6

*β-Diethylamino-ethyl ester of p-isopropoxy-benzoic acid*

Solutions comprising 6.5 g. of p-isopropoxy-benzoyl chloride and 7.7 g. of diethylamino-ethanol, each in 25 cc. of dry benzene, are mixed and warmed on a steam bath for 60 minutes. Filtering off the precipitated diethylamino-ethanol hydrochloride, and evaporating the benzene from the residue, the latter is treated with ether and alcoholic hydrochloric acid to yield the desired ester as the hydrochloride in the form of a white crystalline solid melting at 125.5° C.

EXAMPLE 7

*β-Diethylamino-ethyl ester of p-allyloxy-benzoic acid*

This compound is prepared in the same manner as that of Example 6, except that 8 g. of p-allyloxy-benzoyl chloride (instead of the p-n-propoxy derivative) and 9.5 g. of diethyl-amino-ethanol are used. The boiling point of the ester is 165–175° C./4 mm. The hydrochloride melts at 130° C.

EXAMPLE 8

*β-Diethylamino-ethyl ester of p-(β-bromallyl-oxy)-benzoic acid*

A solution comprising 17 g. methyl p-hydroxy-benzoate and 25 g. 2,3-dibromopropene and a suspension of 20 g. potassium carbonate in 50 cc. of acetone is refluxed, with stirring, for 10 hours; filtering the mixture, evaporating the acetone from the filtrate, hydrolyzing the residue by heating with aqueous sodium hydroxide, precipitating the free acid with hydrogen chloride, and after filtering, washing and drying the precipitate, recrystallizing it from benzene, yields the desired intermediate, p-(β-bromallyl-oxy)-benzoic acid, melting at 200° C. (with decomposition). Warming 9.5 g. of this benzoic acid derivative with 7.7 g. of phosphorus pentachloride and fractionating the mixture in vacuo, yields the desired acid chloride intermediate, boiling at 160–170° C./5 mm.

Refluxing a mixture comprising 6 g. of this p-(β-bromalloxy)-benzoyl chloride and 5.1 g. of diethylamino-ethanol, each dissolved in 25 cc. of dry benzene, for half an hour, filtering off the precipitate and treating the filtrate with alcoholic hydrochloric acid, yields, after evaporating the benzene and hydrogen chloride and recrystallizing the residue from alcohol and ether, the desired compound melting at 81.5–83.5° C.

EXAMPLE 9

*β,β'-di(dimethylamino)-isopropyl ester of p-n-propoxy-benzoic acid (hydrochloride)*

2 g. β,β'-di-(dimethylamino)-isopropanol and 3.2 g. p-n-propoxy benzoyl chloride are each dissolved in 5 cc. chloroform and the solutions mixed. A precipitate forms, which is dissolved by adding dry acetone, and the reaction completed by warming for a short time on the water bath. The solvents are then distilled off, and the residue recrystallized from a mixture of alcohol and ether. The product, which melts at 208° C. with decomposition, is a mixture of the mono- and di-hydrochlorides.

The following are among the many other compounds embraced by the present invention, and may be prepared according to the directions given above:

*Example 10.*—α-Benzyl-α-diethylaminomethyl-propyl ester of p-n-butoxy-benzoic acid.

*Example 11.*—α-Methyl-α-diethylaminomethyl-n-butyl ester of p-n-propoxy-benzoic acid.

The invention may be variously otherwise embodied, within the scope of the appended claims.

We claim:

1. A water soluble salt of a dialkylamino alkanol ester of a p-alkoxy benzoic acid of the following type:

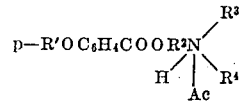

where R' is an aliphatic hydrocarbon residue with 3 to 4 carbon atoms, $R^2$ is an ethylene residue, $R^3$ and $R^4$ are two ethyl residues, and Ac is an acid radical forming a water soluble salt with the ester of the amino alcohol.

2. A water soluble salt of a dialkylamino alkanol ester of a p-alkoxy benzoic acid of the following type:

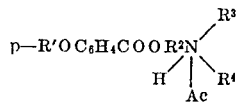

where R' is an alkyl residue with 3 to 4 carbon atoms, $R^2$ is an ethylene residue, $R^3$ and $R^4$ are two ethyl residues, and Ac is an acid radical forming a water soluble salt with the ester of the amino alcohol.

3. As a new compound, the chlorhydrate of β-diethylaminoethyl p-n.butoxy-benzoate.

4. As a new compound, the hydrochloride of β-diethylaminoethyl p-n-propoxy-benzoate.

5. As a new compound, the hydrochloride of β-diethylaminoethyl p-allyloxy-benzoate.

WALTER G. CHRISTIANSEN.
SIDNEY E. HARRIS.